United States Patent [19]

White

[11] Patent Number: 4,721,145

[45] Date of Patent: Jan. 26, 1988

[54] TIRE MOUNTING AND DEMOUNTING MACHINE

[76] Inventor: Basil D. White, 3611 Lymehill Rd., Lauder Hill, Fla. 33319

[21] Appl. No.: 35,992

[22] Filed: Apr. 8, 1987

[51] Int. Cl.$^4$ .............................................. B60C 25/06
[52] U.S. Cl. ................................................... 157/1.2
[58] Field of Search .................... 157/1, 1.1, 1.17, 1.2, 157/1.22, 1.24, 1.26, 1.28

[56] References Cited

U.S. PATENT DOCUMENTS

| | | | |
|---|---|---|---|
| 1,239,454 | 9/1917 | Boyd | 157/1.2 |
| 1,481,061 | 1/1924 | Hunter | 157/1.2 |
| 1,575,869 | 3/1926 | Schmidt . | |
| 1,615,469 | 9/1925 | McKenzie . | |
| 2,479,432 | 8/1949 | Tillotson . | |
| 2,518,126 | 8/1950 | Dono et al. . | |
| 2,742,959 | 4/1956 | Pientkewic . | |
| 3,149,661 | 9/1964 | Pardee | 157/1.2 |
| 3,493,029 | 2/1970 | Kimball . | |
| 3,739,831 | 6/1973 | Smith | 157/1.28 |
| 3,851,696 | 12/1987 | Pihlaja . | |

Primary Examiner—Debra Meislin

Attorney, Agent, or Firm—Lee C. Robinson, Jr.

[57] ABSTRACT

A device for mounting and demounting a beaded pneumatic tire onto and off of a wheel which is particularly adapted for facilitating fitment of a well obstructor onto the well of the wheel. The device has a wheel support assembly which includes an upwardly extending spindle for supporting the wheel. The spindle has axially disposed internal female threads and has an exterior dimensioned so that the spindle can be freely inserted into the axial hole in the wheel. A removable bead pusher assembly is included which has a thrust collar, pusher arms, and a circumferential bead pusher ring connected to the ends of each of the pusher arms. A removable thrust assembly is provided which has a rotatable male threaded member which threadably mates into the female threads of the spindle and has a thrust face adapted to bear against the thrust collar. Rotation of the male threaded member causes the thrust member to bear against the thrust collar and progressively push the bead pusher assembly against the pneumatic tire to axially compress the tire and expose the wheel well to facilitate fitting of the well obstructor onto the wheel well as the male threaded member is screwed into the spindle.

6 Claims, 4 Drawing Figures

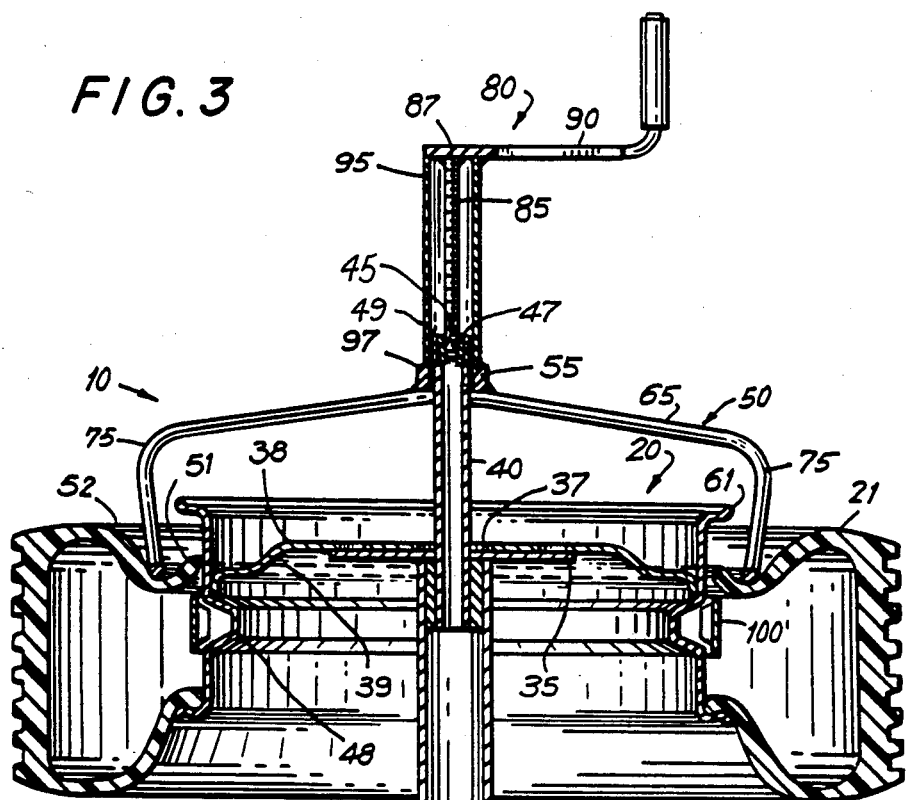
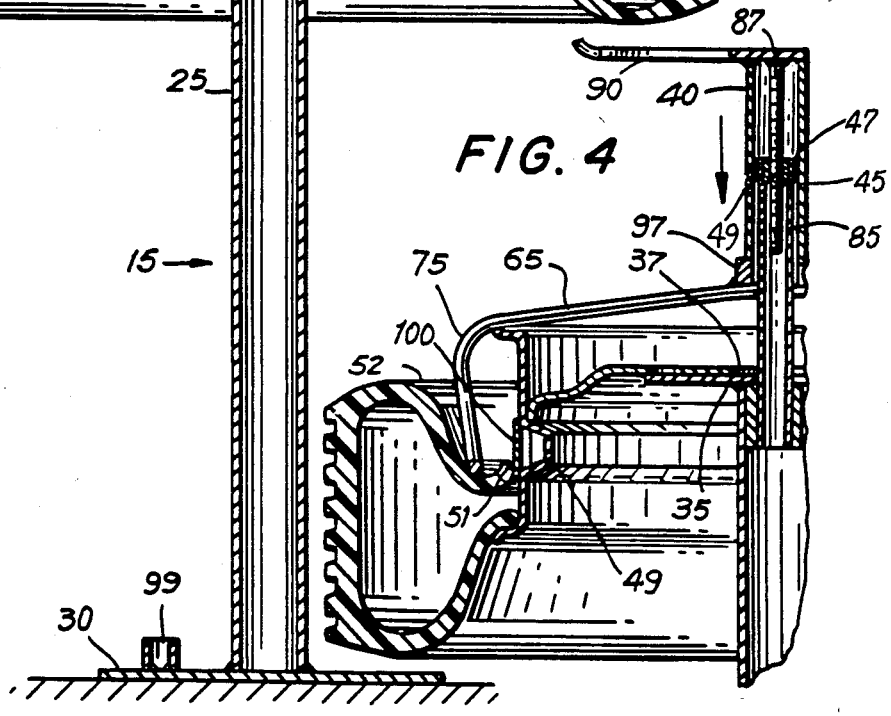

TIRE MOUNTING AND DEMOUNTING MACHINE

BACKGROUND OF THE INVENTION

The present invention relates to devices for mounting and demounting beaded pneumatic tires from wheels, and in particular to a mounting and demounting device which is specially adapted for compressing the pneumatic tire to facilitate installation of a well obstructor band.

PRIOR ART

Machines of various designs used for mounting and demounting pneumatic tires have been known for many years. Such mounting and demounting devices are shown, for example, in U.S. Pat. Nos. 3,149,661; 1,239,454 and 1,481,061. Such devices generally include a bead compression member with a plurality of discrete points of contact for compressing the bead of the tire. An exposed screw thread and mating threaded member which can be turned to screw down the compression member to push the bead of the tire away from the rim of the wheel to facilitate removal of the tire from the wheel.

The discrete points of contact of the compression member with the tire allow the same compression member to be used with various tire and wheel sizes, but the use of discrete points of contact does not provide uniform compression of the tire, thus risking damage to the tire during the removal or replacement operation.

Some effort has been made to partially alleviate the problem of uniform loading of the tire in certain particularly sensitive applications, such as aircraft tires mounted on split lock ring type hubs of lightweight metal alloy, by use of a circumferential compression ring such as shown in U.S. Pat. No. 2,518,126. It is believed, however, that the device disclosed in U.S. Pat. No. 2,518,126 has been limited in applicability to special split ring type hubs and has not found successful application for mounting and demounting tires onto conventional wheels having wheel wells, such as are used for automobiles.

There has also come into use a device known as a well-obstructor band, shown, for example, in U.S. Pat. No. 4,122,882. The purpose of a well-obstructor band is to cover up the well of the wheel so that, in the event of accidental loss of air during operation of the vehicle, the bead of the tire will not be able to enter the well. This helps to prevent the tire from falling off the wheel, thus providing increased safety.

Such well-obstructor bands are installed onto the well of the wheel during fitment of the tire onto the wheel, and it has been found that for this operation, the well of the wheel should be exposed on all sides simultaneously to facilitate proper and safe fitment. To expose the well, the tire must generally be compressed axially a sufficient distance to expose the well of the wheel, and with the greatest degree possible of open area between the tire and wheel. Conventional prior art tire mounting and demounting devices have not proven fully satisfactory for this purpose because they do not permit sufficient and uniform compression of the tire.

OBJECTS OF THE INVENTION

It is an object of this invention to provide a mounting and demounting device which will axially compress a beaded pneumatic tire without damage to the tire or the wheel.

It is a further object of the invention to provide a tire mounting and demounting device which is sturdy and easy to operate.

It is a still further object of the present invention to provide a mounting and demounting device which has means built in for holding the tools required for mounting and demounting the tire.

It is a still further object of this invention to provide a mounting and demounting device which has a removable thrust assembly for applying the compressive force necessary to compress the pneumatic tire which not prone to damage from careless handling.

SUMMARY OF THE INVENTION

The disadvantages of the prior art are overcome by means of a device for fitting a well obstructor onto a wheel for a beaded pneumatic tire, which wheel has an axial hole therethrough, a circumferential well, and a peripheral rim having a maximum external diameter. The inventive device has a wheel support assembly for supporting the wheel, which wheel support assembly has an upwardly extending spindle having internal female threads axially disposed therein and an exterior dimension such that the spindle is freely insertable through an axial hole in the wheel. A removable bead pusher assembly is provided which has a thrust collar having a central hole dimensioned to slidably fit over the exterior of the spindle. The bead pusher assembly further has pusher arms connected to the thrust collar, each of which has a generally radially extending portion which extends radially a distance greater than the maximum external radius of the rim. The pusher arms further have a generally downwardly extending portion having a terminus, which terminus is connected to a circumferential bead pusher ring. This bead pusher ring has a minimum internal diameter greater than the maximum external diameter of the rim. A removable thrust assembly is included which has a male threaded member and a thrust member, the male threaded member having a first end, a second end and threads adapted to threadably mate with the female threads in the spindle. This thrust assembly is connected to the first end of the male threaded member and has a thrust face adapted to bear against the thrust collar. Means are also provided for rotating the thrust assembly with the male threaded member threadably mated to the female threads of the spindle to cause the thrust member to bear against the thrust collar to progressively push the bead pusher assembly in the axial direction to compress the pneumatic tire.

BRIEF DESCRIPTION OF THE DRAWINGS

The above and other objects, features and advantages of this invention will become evident upon reading the following detailed description of an illustrative embodiment of the invention and the accompanying drawings wherein:

FIG. 3 is a cross-sectional elevational view taken along the line 3—3 of FIG. 2 showing the mounting and demounting device with the bead pusher assembly having compressed the tire approximately one-third of the axial width of the wheel; and FIG. 4 is a partial cross-sectional view, similar to FIG. 3, showing the bead pusher assembly in its fully compressed condition, exposing the well of the wheel.

DETAILED DESCRIPTION

Figure 1:
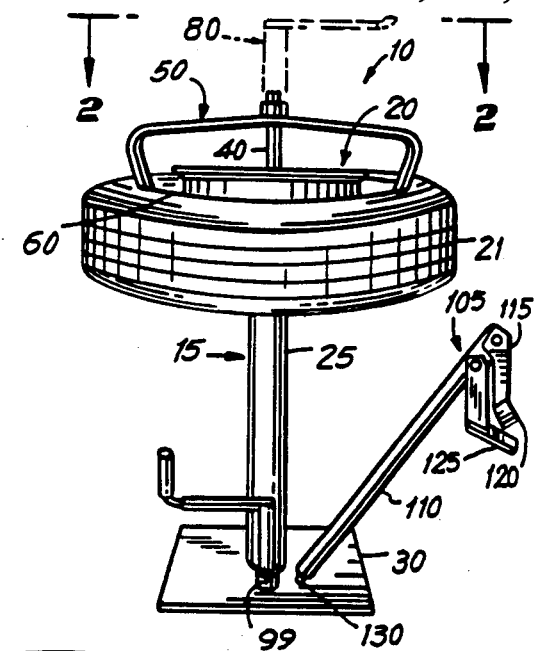
FIG. 1 is a perspective view of a mounting and demounting device constructed in accordance with the present invention, with a wheel and tire mounted on the device.
Figure 2:
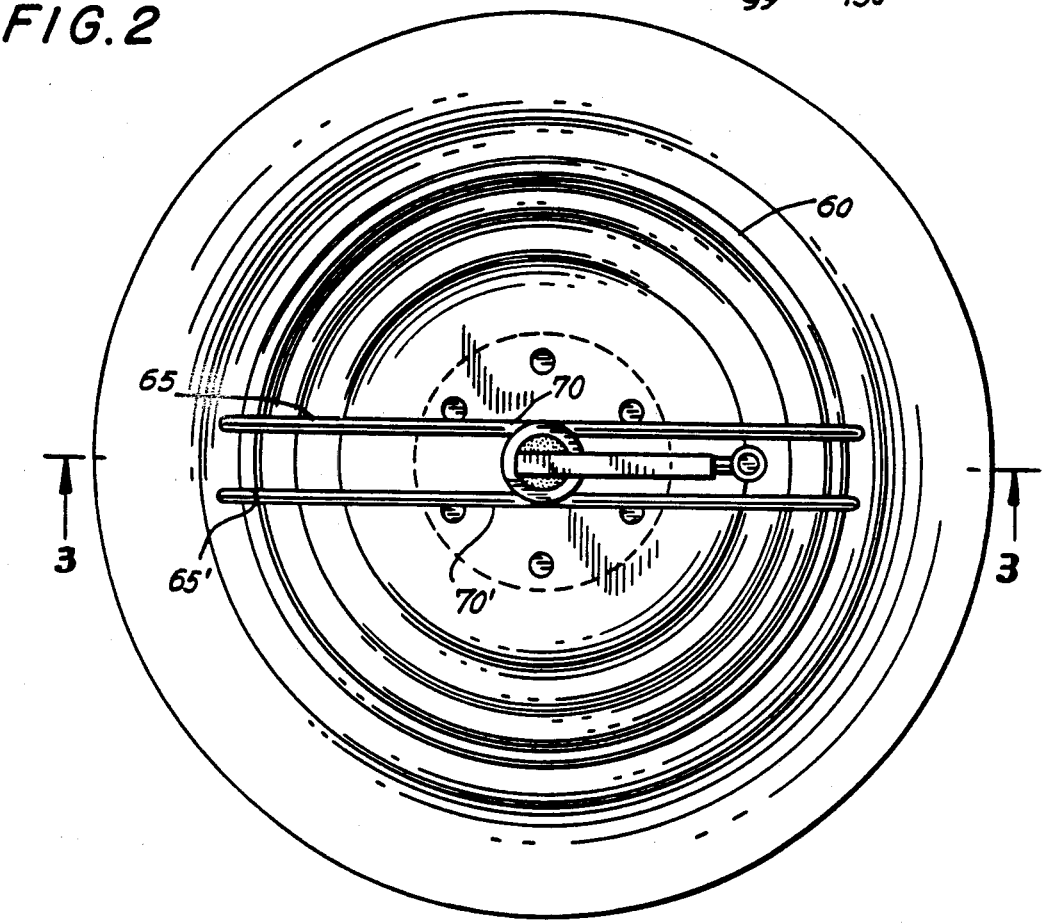
FIG. 2 is a plan view of the device shown in FIG. 1, with the tire and wheel mounted on the device, and the bead pusher assembly and a hand crank installed.

Referring now to the drawings in detail and particularly to FIGS. 1, 2 and 3, a pneumatic tire mounting and demounting device 10 constructed in accordance with the present invention is illustrated.

The device 10 has a wheel support assembly 15 for holding the wheel 20 and its associated pneumatic tire 21 at a convenient working height. Preferably, the wheel support assembly has a pedestal 25 fabricated of a material having suitable strength characteristics, such as steel. Pedestal 25 is conveniently tubular for ease of fabrication, but other shapes, such as a square or an I-beam may also be employed.

Pedestal 25 is preferably firmly affixed at its lower end to a base member 30, which is conveniently a flat, square piece of steel, as by welding or bolting, to provide a firm footing to prevent tipping of the mounting and demounting device 10. This base 30 may be bolted or otherwise affixed to the surface upon which it rests, or alternately, it may remain loose if portability of the mounting and demounting device is desired.

In order to support the wheel 20 at the top of pedestal 25, a support plate 35 is firmly affixed to the top of the pedestal by any convenient means, such as by welding. The support plate 35 should preferably be round, and have a diameter greater than the diameter of the axial hole 37 present in the hub 38 of the wheel, but smaller than the inner radius of the dished-out portion 39 of the wheel so as to provide a stable platform to hold the hub 38 of the wheel 20 during operation of the mounting and demounting device.

The wheel support assembly 15 includes a hollow spindle 40 at the top of the pedestal 25 which extends above the wheel support plate 35. Spindle 40 is fabricated of a suitably strong material, such as steel, and preferably has a relatively smooth exterior which is advantageously cylindrical in shape. The hollow spindle has axially disposed internal female threads 45 and is open at at least its free end 47. For ease of fabrication, the female threads 45 are preferably separately formed in a female threaded sleeve 49 which can be affixed inside the spindle, however, the spindle 40 may also have the threads formed directly in its hollow interior. Spindle 40 preferably has a length extending above the wheel support plate 35 of at least one half the axial width of the largest wheel 20 to be used in the mounting and demounting device 10 so that the tire can be compressed to at least the midpoint of the wheel to expose the well 48 of the wheel in a manner to be further described.

A bead pusher assembly 50 is provided to axially push the bead 51 or sidewalls 52 of the pneumatic tire 21 away from the rim of the wheel. The bead pusher assembly 50 is removable over the top of the spindle. This bead pusher assembly 50 includes a slidable thrust collar 55 which fits over the exterior of the spindle 40 with a sliding fit. Thrust collar 55 is preferably of the same general shape as the exterior of the spindle, which in the case of a spindle having a cylindrical exterior, is round.

A circumferential bead pusher ring 60 is provided which is larger in internal diameter than the maximum external diameter of the rim 61 of the wheel to be used in the mounting and demounting device. This ring is continuous all around the circumference of the wheel rim to provide uniform pressure to the entire circumference of the side of the tire 21. It is desirable that the pusher ring be only slightly larger than the maximum diameter of the rim 61 on the wheel to be used on the device. Therefore, it is preferable that, if several different diameter or width hubs are to be used on the mounting and demounting device, that a corresponding number of removable bead pusher assemblies be provided to be used with the appropriate wheel size.

Bead pusher ring 60 is connected to the thrust collar 55 by means of pusher arms 65 and 65'. The pusher arms 65 and 65' preferably are fabricated of a single piece of rod of suitably strong material such as steel, which is bent into the shape of roughly an inverted U. The bight 70 (and 70') of the U have a length greater than the diameter of the rim of the wheel to be used in the mounting and demounting device so that the pusher arms will not interfere with the rim of the wheel when the pusher assembly is compressed onto the tire. Each of the downwardly directed legs 75 (and 75') of the U preferably has a length of at least one-half the axial width of the largest wheel to be used in the mounting and demounting device so that when the bead pusher assembly is pushed to its full extent, the circumferential ring can be axially compressed to at least the axial midpoint of the wheel so as to expose all sides of the well 48 of the wheel. Pusher arms 65 (and 65') are preferably parallel to and spaced apart from each other and are attached substantially tangentially to the collar 55 by convenient means such as welding. The parallel configuration is preferred because it provides a large open area and simple fabrication, while the spacing between the arms 65 (and 65') ensures that the ring 51 is securely maintained in an orientation perpendicular to the axis of the spindle 40.

In order to push the bead pusher assembly 50 down so as to compress the tire, a removable thrust assembly 80 is provided which attaches to the top of the spindle 40 after the wheel and the bead pusher assembly are in place over the spindle. Thrust assembly 80 has a male threaded member 85 which preferably has a length greater than one-half the width of the largest wheel to be used in the mounting and demounting device. This ensures that the bead pusher assembly can be compressed to the degree required to expose the well 48 of the wheel, which is generally at or near the axial midpoint of the wheel.

The male threaded member 85 has a hollow, preferably cylindrical, thrust sleeve 95 surrounding it, which has a free end having a thrust base 97 thereon adapted to bear against the face of the thrust collar 55. Hollow thrust sleeve 95 is radially spaced away from the male threaded member 85 and has an internal diameter slightly greater than the external diameter of spindle 40 so that spindle 40 will axially slide into the sleeve 95 when the male threaded member is threaded into the female threads 45 of spindle 40.

The length of sleeve 85 is advantageously at least slightly longer than the length of male threaded member 85 so that the front or free end of the male threaded member is always recessed inside thrust sleeve 95. By recessing the end of the male threaded member inside the sleeve, the male threads are less prone to damage by careless handling of the thrust assembly.

The back end 87 of male threaded member 85 is fixedly connected to a means for turning the male threaded member, which is conveniently a hand crank 90. Other manual means, such as a hand wheel can also be employed. Furthermore, in the case where large or heavy duty tires are to be mounted, an air or electric motor may also advantageously be employed to turn the male threaded member. Conveniently, the upper end of sleeve 85 is also firmly affixed to the turning means 90, such as by welding, although this is not required and the sleeve may be free to rotate with respect to the male threaded member without departing from the invention.

In order to ensure that thrust assembly 80 will be handy when it is needed, a socket 99 is provided on base 30 of pedestal 25 for holding thrust assembly 80 when it is not in use.

To operate the mounting and demounting device of the present invention to fit a well obstructor band 100 onto the well of a wheel, a wheel with its associated pneumatic tire is placed onto the wheel support plate 35. An appropriately sized bead pusher assembly 50 is then placed over the end of the spindle 40 with the slidable thrust collar 55 slidably inserted over the end of the spindle. Thrust assembly 50 is then placed over the end of the spindle and the male threaded member 85 threaded into the female threads 45 of the spindle until the thrust base 97 of the sleeve surrounding the male threaded member contacts the thrust face of the thrust collar 55. The male threaded member is then further threaded into the female threads by the hand crank or other means, thereby pushing the bead pusher assembly down until the bead of the tire is separated from the rim of the wheel. Continued threading of the male threaded member into the female threads of the spindle causes further compression of the sidewall of the tire to the degree necessary to expose the well of the wheel, as shown in FIG. 4. With the well thus exposed, the well obstructor band 100, can be easily and safely installed or removed.

To remount the bead onto the rim of the wheel, the male threaded member is unscrewed from the female threads of the spindle until the bead of the tire contacts the rim.

In addition to exposing the well of the wheel for the purpose of installing the well obstructor band, the mounting and demounting device of the present invention is also well suited for complete removal or replacement of the pneumatic tire on the wheel. To do so, a bead breaker tool 105 is provided for lifting the bead 51 of the pneumatic tire over the rim of the wheel. Bead breaker tool 105 has a hand lever 110 at one end and a hinged collar arm 115 at its other end which terminates in a slidable collar 120. The slidable collar 120 is adapted to fit around and to freely rotate on the outside of the exterior of the spindle 40. A hinged bead lifter bar 125 is attached at the throat portion of the bead breaker tool, proximal to and inwardly disposed from the hinged collar arm 115.

To operate the bead breaker tool, the bead pusher assembly is removed, and the collar 120 of the hinged collar arm 115 placed over the end of spindle 40. The rim 61 bar 125 is then manually placed underneath the bead of the wheel, and rotated around the circumference of the wheel, pressing the bead as it goes around until the bead of the tire is separated from the wheel.

To install the bead of the tire over the rim of the wheel, the bead bar 125 is inserted over the bead and under the rim at one side and rotated around the circumference of the rim, thereby progressively pushing the bead over the rim until the entire bead is inside the rim.

To insure that the bead breaker tool is handy when needed, a post 130 is provided at the base of the wheel support assembly to retain the bead breaker tool when it is not in use.

As can be seen, the present invention provides a tire mounting and demounting device which is simple to use, and which can safely and simply expose the well of the wheel to permit safe and simple attachment of a well obstructor band to the wheel without damage to the tire or the wheel itself.

Although an illustrative embodiment of the present invention has been described herein in reference to the accompanying drawings, it is to be understood that various changes and modifications may be effected therein by one skilled in the art without departing from the scope or spirit of the invention.

I claim:

1. A device for fitting a well obstructor onto a wheel for a beaded pneumatic tire, which wheel has an axial hole therethrough, a circumferential well, and a peripheral rim having a maximum external diameter, said device comprising a wheel support assembly for supporting said wheel, said wheel support assembly having an upwardly extending spindle, said spindle having internal female threads axially disposed therein and an exterior dimensioned such that said spindle is freely insertable through said axial hole in said wheel;

a removable bead pusher assembly, said bead pusher assembly including a thrust collar, said thrust collar having a central hole therethrough which is dimensioned to slidably fit over the exterior of said spindle, at least two pusher arms connected to said thrust collar, each of said pusher arms having a generally radially extending portion which extends radially a distance greater than the maximum external diameter of said rim and a generally downwardly extending portion having a terminus, a circumferential bead pusher ring connected to said terminus of each of said pusher arms, said pusher ring having a minimum internal diameter greater than the maximum external diameter of said rim;

a removable thrust assembly including a male threaded member and a thrust member, said male threaded member having a first end, a second end and threads adapted to threadably mate with said female threads in said spindle, said thrust member being connected to said first end of said male threaded member and having a thrust base adapted to bear against said thrust collar; and means for rotating said thrust assembly with said male threaded member threadably mated into said female threads of said spindle to cause said thrust base of said thrust member to bear against said thrust collar to progressively push said bead pusher assembly in the axial direction against said pneumatic tire, thereby to axially compress said tire and expose said wheel well to facilitate fitting of said well obstructor onto said wheel well.

2. A device for fitting a well obstructor onto a wheel for a beaded pneumatic tire, which wheel has an axial hole therethrough, a circumferential well, and a peripheral rim having a maximum external diameter, said device comprising a wheel support assembly for supporting said wheel, said wheel support assembly having a pedestal, a wheel support member mounted on said pedestal, and a spindle extending upwardly above said wheel support member, said spindle having internal female threads axially disposed therein and an exterior dimensioned such that said spindle is freely insertable through said axial hole in said wheel;

a removable bead pusher assembly, said bead pusher assembly including a thrust collar, said thrust collar having a central hole therethrough which is dimensioned to slidably fit over the exterior of said spindle, at least two pusher arms connected to said thrust collar, each of said pusher arms having a generally radially extending portion which extends radially a distance greater than the maximum external diameter of said rim and a generally downwardly extending portion having a terminus, a circumferential bead pusher ring connected to said terminus of each of said pusher arms, said pusher ring having a minimum internal diameter greater than the maximum external diameter of said rim;

a removable thrust assembly including a male threaded member and a thrust member, said male threaded member having a first end, a second end and threads adapted to threadably mate with said female threads in said spindle, said thrust member being connected to said first end of said male threaded member and having a thrust base adapted to bear against said thrust collar; and means for rotating said thrust assembly with said male threaded member threadably mated into said female threads of said spindle to cause said thrust base of said thrust member to bear against said thrust collar to progressively push said bead pusher assembly in the axial direction against said pneumatic tire, thereby to axially compress said tire and expose said wheel well to facilitate fitting of said well obstructor onto said wheel well.

3. The device as defined in claim 2, wherein said wheel support assembly further includes a base, said base having means for holding a bead breaker lever.

4. A device for fitting a well obstructor onto a wheel for a beaded pneumatic tire, which wheel has an axial hole therethrough, a circumferential well, and a peripheral rim having a maximum external diameter, said device comprising a wheel support assembly for supporting said wheel, said wheel support assembly having an upwardly extending spindle, said spindle having internal female threads axially disposed therein and an exterior dimensioned such that said spindle is freely insertable through said axial hole in said wheel;

a removable bead pusher assembly, said bead pusher assembly including a thrust collar, said thrust collar having a central hole therethrough which is dimensioned to slidably fit over the exterior of said spindle, at least two pusher arms connected to said thrust collar, each of said pusher arms having a generally radially extending portion which extends radially a distance greater than the maximum external diameter of said rim and a generally downwardly extending portion having a terminus, a circumferential bead pusher ring connected to said terminus of each of said pusher arms, said pusher ring having a minimum internal diameter greater than the maximum external diameter of said rim;

a removable thrust assembly including a male threaded member and a thrust member, said male threaded member having a first end, a second end and threads adapted to threadably mate with said female threads in said spindle, said thrust member being connected to said first end of said male threaded member and having a thrust base adapted to bear against said thrust collar; and a hand crank for rotating said thrust assembly with said male threaded member threadably mated into said female threads of said spindle to cause said thrust base of said thrust member to bear against said thrust collar to progressively push said bead pusher assembly in the axial direction against said pneumatic tire, thereby to axially compress said tire and expose said wheel well to facilitate fitting of said well obstructor onto said wheel well.

5. A device for fitting a well obstructor onto a wheel for a beaded pneumatic tire, which wheel has an axial hole therethrough, a circumferential well, and a peripheral rim having a maximum external diameter, said device comprising a wheel support assembly for supporting said wheel, said wheel support assembly having an upwardly extending spindle, said spindle having internal female threads axially disposed therein and an exterior dimensioned such that said spindle is freely insertable through said axial hole in said wheel;

a removable bead pusher assembly, said bead pusher assembly including a thrust collar, said thrust collar having a central hole therethrough which is dimensioned to slidably fit over the exterior of said spindle, at least two pusher arms connected to said thrust collar, each of said pusher arms having a generally radially extending portion which extends radially a distance greater than the maximum external diameter of said rim and a generally downwardly extending portion having a terminus, said downwardly extending portions of said pusher arms extending downwardly a distance at least equal to one half the axial width of the wheel so that said bead pusher ring can be freely pushed in an axial direction to at least the axial midpoint of said wheel;

a circumferential bead pusher ring connected to said terminus of each of said pusher arms, said pusher ring having a minimum internal diameter greater than the maximum external diameter of said rim;

a removable thrust assembly including a male threaded member and a thrust member, said male threaded member having a first end, a second end and threads adapted to threadably mate with said female threads in said spindle, said thrust member being connected to said first end of said male threaded member and having a thrust base adapted to bear against said thrust collar; and means for rotating said thrust assembly with said male threaded member threadably mated into said female threads of said spindle to cause said thrust base of said thrust member to bear against said thrust collar to progressively push said bead pusher assembly in the axial direction against said pneumatic tire, thereby to axially compress said tire and expose said wheel well to facilitate fitting of said well obstructor onto said wheel well.

6. A device as claimed in claim 1, in which
said thrust member comprises a sleeve circumferentially surrounding and radially spaced away from said male threaded member, said sleeve having a first end and a second end, said first end of said sleeve being connected to said first end of said male threaded member and said second end of said sleeve being adapted to bear against said thrust assembly, said sleeve having an internal dimension greater than the external dimension of said spindle so that said spindle can fit inside said sleeve when said male threaded member is threaded into said female threads of said spindle, said sleeve further having a length greater than the length of said male threaded member so that the second end of said male threaded member is always recessed inside said sleeve, said second end of said sleeve having a thrust face thereon which is adapted to bear against said thrust collar.

* * * * *